Patented July 13, 1937

2,086,559

UNITED STATES PATENT OFFICE 2,086,559

HYDROGENATED ERGOTOCIN

Morris S. Kharasch, Chicago, Ill., assignor to Eli Lilly and Company, Indianapolis, Ind., a corporation of Indiana No Drawing. Application January 30, 1936, Serial No. 61,544

9 Claims. (Cl. 260—25)

My invention relates to the new product, hydrogenated ergotocin, and the process of producing it.

Ergotocin is a newly discovered active principle of ergot, having a remarkable potency on oral administration. It probably has the formula $C_{19}H_{21}N_3O_2$, when free from alcohol of crystallization; but when alcohol of crystallization is present the formula is probably $C_{21}H_{27}N_3O_3$. Its melting point is 158° to 161° C.; and its specific optical rotation in methyl alcohol is +40.2°. Ergotocin may be produced by several processes, some of which have been described in the literature. It is also known by the names of ergometrine, ergostetrine, ergobasin, and ergonovine. (Jour. A. M. A., March 21, 1936, pages 1008, 1012, and 1013.) For convenience, however, regardless of what may eventually become accepted as the name of such new active principle, I shall herein refer to it by the name ergotocin, which is the name by which it is denoted in a co-pending application, Serial No. 20,628, filed by Romeo Ralph Legault and myself on May 9, 1935. In that prior application, the new product ergotocin and a process of obtaining it are described. Ergotocin has certain highly desirable oxytocic properties, and is proving highly effective in the treatment of postpartum human mothers.

I have now discovered that this ergotocin can be hydrogenated, by the introduction of hydrogen into the ergotocin molecule, and that the hydrogenated ergotocin not only has the advantageous properties of ergotocin itself but in addition has some other advantages, such as increased stability.

I have also hydrogenated ergotoxin and ergotamine by the procedures herein set forth; but I shall claim that subject-matter in another application.

In obtaining hydrogenated ergotocin, I proceed in general as follows:

The ergotocin, desirably fairly pure, or a salt thereof, is dissolved in any organic solvent in which it is soluble and which is inert toward ergotocin and toward the catalyst used. Among such solvents are glacial acetic acid, alcohols, ether, benzene, and toluene. Water may also be used as the solvent, in which case an ergotocin salt is preferred as the solute. Whenever a salt is used, it is advantageous to use an organic salt, such as the maleate or the tartrate or the oxalate or the acetate, because of the better keeping qualities of such organic salts.

The solution of ergotocin, or of the ergotocin salt, is then subjected to hydrogenation by hydrogen gas, in a closed system; desirably under pressure, which may vary from two or three centimeters of mercury to several atmospheres. The hydrogenation is helped by agitation. To facilitate the entrance of hydrogen into the ergotocin molecule a hydrogenation catalyst is present, such as active platinum, desirably introduced as the dioxide, or active paladium.

The hydrogenation is continued until one mole of hydrogen is taken up per mole of ergotocin; which introduces two atoms of hydrogen into the ergotocin molecule, probably by the saturation of a double bond, to produce dihydroergotocin. In glacial acetic acid, and with an active platinum or palladium catalyst present, this hydrogenation in small quantities is usually complete in about 20 minutes. The pressure maintained during hydrogenation is desirably only slightly above atmospheric pressure, as of the order of from two to five centimeters of mercury; and the temperature is desirably low, conveniently about room temperature.

The following examples show variations of my process:

Example 1

About 0.2 g. of ergotocin, or of its maleate (which is on the market under the trade-mark "Ergotrate"), is dissolved in about 15 to 20 cc. of glacial acetic acid, and 0.05 g. of an active platinum catalyst, added as $PtO_2$ (or other suitable hydrogenation catalyst,) is added to the mixture. Whether the initial material is ergotocin or its maleate, the solute in the glacial acetic acid is an ergotocin salt.

The mixture prepared as above is now hydrogenated in a closed system, under a pressure of about two centimeters of mercury, at or near room temperature. The absorpton of hydrogen is quite rapid, and the reaction is usually practically complete within twenty or thirty minutes. The completion of the reaction may be determined in two ways:

a. By the fact that one mole of hydrogen (two moles if ergotocin maleate is being hydrogenated) has been absorbed, as determined by measuring in any suitable way the amount of hydrogen gas absorbed. When ergotocin maleate ("Ergotrate") is the salt in solution in this Example 1, not only is the ergotocin hydrogenated to make dihydroergotocin, but the maleate is also hydrogenated to produce the succinate. Hence, in thus hydrogenating ergotocin maleate, it is necessary to introduce two moles of hydrogen per mole of ergotocin maleate.

b. By the fact, determined by tests and samples, that the optical rotation of the solution has reached a constant levo value; for the solution of the salt in acetic acid has an optical rotation which is dextro, and as the hydrogenation continues that optical rotation gradually becomes less dextro, passes through zero, and becomes increasingly levo until it reaches a constant value. That value depends on the amount of acetic acid present and on the length of the tube.

When necessary, more catalyst may be added to complete the desired absorption of hydrogen; but this is ordinarily not necessary if the catalyst is active.

On the completion of the desired hydrogenation, the ergotocin salt has been changed into the salt of hydrogenated ergotocin—a dihydroergotocin salt.

Hydrogenated ergotocin as a free base may be separated from this solution as follows: The solution is made alkaline, as with sodium carbonate or sodium hydroxide (preferably sodium carbonate), to neutralize the acetic acid and to convert the salt into the free base; and that free base (which is dihydroergotocin) is extracted from the alkaline solution by shaking out with chloroform. That is, the free base goes into the chloroform phase. The chloroform solution is suitably dried, as with sodium sulfate; is filtered, to free it from any contaminating solids; and is suitably evaporated to dryness to remove the chloroform, desirably under vacuum and at a temperature which does not exceed 60° C., to obtain the dihydroergotocin in solid form.

Instead of neutralizing the glacial acetic acid, as with sodium carbonate, the hydrogenated mixture may be filtered to remove the catalyst, and the glacial acetic acid evaporated in high vacuum. The solid which remains is then treated with a water solution of sodium carbonate, and the dihydroergotocin extracted with chloroform. The chloroform solution thus obtained is treated as above described.

The solid thus obtained can be crystallized from benzene. This crystalline solid, when thoroughly dried and in pure state, has a melting point (with decomposition) of 227° to 232° C., corrected, depending on the rate of heating as contrasted with about 159° C. (with decomposition) for ergotocin.

The specific optical rotation of this dihydroergotocin in methyl alcohol is about −71° C., at 25° and with sodium light; as compared with +40.2° for ergotocin itself.

The salts of dihydroergotocin, such as the acetate, succinate, maleate, etc., are levo-rotatory in water solution; while those of ergotocin are dextro-rotatory.

The dihydroergotocin salts are effective when administered intravenously to postpartum human mothers in doses of 0.2 mg.—which is about the same as with ergotocin and its salts. The response is prompt (within about 30 seconds), and is accompanied with considerable tetany, again about the same as with ergotocin.

*Example 2*

Instead of hydrogenating ergotocin or its salts in glacial acetic acid, a water solution of one of its salts may be employed, such as a water solution of the maleate, tartrate, oxalate, or acetate.

About 0.2 g. of ergotocin maleate is dissolved in 20 cc. of water, and 0.05 g. of an active platinum catalyst, added as $PtO_2$, (or other hydrogenation catalyst,) is added. Hydrogen gas is then introduced, in the same manner as in Example 1, under a pressure of 2 to 4 cm. of mercury. Although the hydrogenation proceeds quite readily, it does so rather more slowly than in the case of ergotocin in glacial acetic acid, as indicated by the rate of gas absorption; and it is sometimes necessary to increase the amount of catalyst, as by doubling it or by adding a second quantity of it if the reaction is incomplete. The end result, however, as before, is a dihydroergotocin salt in solution. The dihydroergotocin may be obtained in base form from this solution in the same manner as described in Example 1— by making alkaline, shaking out with chloroform, and evaporating to dryness in vacuo at low temperature.

During the hydrogenation, as in Example 1, the optical rotation is changed from dextro to levo; for the solution of the ergotocin maleate in water is dextro-rotatory, and gradually becomes levo-rotatory as the hydrogenation proceeds.

When ergotocin maleate ("Ergotrate") is the salt in solution in this Example 2, not only is the ergotocin hydrogenated to make dihydroergotocin, but the maleate is also hydrogenated to produce the succinate. Hence, in thus hydrogenating ergotocin maleate, it is necessary to introduce two moles of hydrogen per mole of ergotocin maleate.

When the hydrogenation is carried out in water solution, as in this Example 2, the material when first separated from the catalyst (which is solid) by filtration has a slight fluorescence, and on standing for a few hours turns a faint pink color; but that does not interfere with the obtaining of a colorless dihydroergotocin and its salts by the remainder of the process as outlined above.

*Example 3*

The procedures of Examples 1 and 2 may be varied by using either active palladium or active platinum, as such or on asbestos, as the catalyst— advantageously about 0.03 g. for 0.2 g. of ergotocin or ergotocin maleate. In all cases, the amount of catalyst may be varied in accordance with the time desired for obtaining the desired hydrogenation—less catalyst for longer periods of hydrogenation.

*Example 4*

Instead of using a solvent in which the ergotocin is present as a salt, as it is in either Example 1 or Example 2, I may dissolve the free base ergotocin in a solvent which permits it to remain in the form of a base. Benzene is such a solvent.

About 0.1 g. of ergotocin, the free base, is dissolved in 25 cc. of hot benzene; and 0.05 g. of an active platinum catalyst (or other hydrogenation catalyst) is added. Hydrogen is then introduced into the hot solution, in a closed system, under a pressure of about three to four centimeters of mercury. The hydrogenation is continued until one mol. of hydrogen has been absorbed. The hydrogenated ergotocin thus produced, which is in base form, is separated from the benzene by the usual crystallization process; as by cooling the solution, and/or by evaporating the benzene under low pressure and temperature.

It is desirable that care be taken not to introduce more than one mol. of hydrogen per mol. of ergotocin. This is because more hydrogen than that can be introduced. If too large an amount of catalyst is used, say 0.2 g. of $PtO_2$ for 0.2 g. of ergotocin, and if the hydrogenation is continued for a long time, say from one to two hours, it is found that five mols of hydrogen are introduced per mol. of ergotocin. In that case an oil is obtained that is inactive when administered to postpartum human mothers. When less than one mol. of hydrogen per mol. of ergotocin is introduced, or when more than one mol. but less than five mols of hydrogen are introduced per mol. of ergotocin, the resultant product is active, but its activity is less than dihydroergotocin obtained by introducing one mol. of hydrogen per mol. of ergotocin.

In the examples given I have mentioned platinum and palladium as the catalysts, since they are the preferred catalysts, and of the two platinum is preferred. However, instead of either of these, I may use any other hydrogenation catalyst, such for example as the Raney catalyst (of nickel and aluminum) or sodium in alcohol, to facilitate the introduction of hydrogen into the ergotocin molecule. All that is necessary is that the catalyst be such that it liberates active or atomic hydrogen from the molecular hydrogen of the supplied hydrogen gas.

I claim as my invention:

1. Hydrogenated ergotocin.
2. Dihydroergotocin.
3. The process of hyrogenating ergotocin, which consists in treating with hydrogen gas a solution of a substance of the class consisting of ergotocin and its salts, in the presence of a hydrogenation catalyst.
4. The process of hydrogenating ergotocin, which consists in treating with hydrogen gas a solution of a substance of the class consisting of ergotocin and its salts, in the presence of a platinum catalyst.
5. The process of hydrogenating ergotocin, which consists in treating with hydrogen gas a solution of a substance of the class consisting of ergotocin and its salts, in the presence of a palladium catalyst.
6. The process of hydrogenating ergotocin, which consists in treating with hydrogen gas a substance of the class consisting of ergotocin and its salts dissolved in glacial acetic acid, in the presence of a platinum catalyst.
7. The process of hydrogenating ergotocin, which consists in treating a salt of ergotocin in water solution with hydrogen gas in the presence of a platinum catalyst.
8. The process of hydrogenating ergotocin, which consists in treating a substance of the class consisting of ergotocin and its salts with hydrogen gas in an organic solvent which is inert toward ergotocin, in the presence of a hydrogenation catalyst.
9. The process of hydrogenating ergotocin, which consists in treating ergotocin in benzene with hydrogen gas in the presence of a hydrogenation catalyst.

MORRIS S. KHARASCH.